(12) United States Patent
Bull et al.

(10) Patent No.: US 7,945,811 B2
(45) Date of Patent: May 17, 2011

(54) LOW POWER, HIGH RELIABILITY SPECIFIC COMPOUND FUNCTIONAL UNITS

(75) Inventors: David Michael Bull, Cambridge (GB); Ganesh Suryanarayan Dasika, Ann Arbor, MI (US)

(73) Assignees: ARM Limited, Cambridge (GB); The Regents of the University of Michigan, Ann Arbor, MI (US)

( * ) Notice: Subject to any disclaimer, the term of this patent is extended or adjusted under 35 U.S.C. 154(b) by 302 days.

(21) Appl. No.: 12/285,373

(22) Filed: Oct. 2, 2008

(65) Prior Publication Data

US 2009/0282281 A1 Nov. 12, 2009

Related U.S. Application Data

(60) Provisional application No. 61/052,375, filed on May 12, 2008.

(51) Int. Cl.
*G06F 11/00* (2006.01)

(52) U.S. Cl. .......................................................... 714/10

(58) Field of Classification Search .................... 714/30, 714/10, 11, 731, 732
See application file for complete search history.

(56) References Cited

U.S. PATENT DOCUMENTS

| 7,000,164 | B2* | 2/2006 | Siegel et al. .................. 714/731 |
| 7,113,749 | B2* | 9/2006 | Smith et al. ................ 455/67.11 |
| 7,320,091 | B2* | 1/2008 | Blaauw et al. .................. 714/30 |
| 7,401,273 | B2* | 7/2008 | Lee et al. ...................... 714/724 |
| 2002/0038418 | A1* | 3/2002 | Shimamura ................... 712/245 |
| 2004/0216005 | A1* | 10/2004 | Pramanick et al. ............. 714/30 |

* cited by examiner

*Primary Examiner* — Marc Duncan
(74) *Attorney, Agent, or Firm* — Nixon & Vanderhye P.C.

(57) ABSTRACT

To prevent short path errors from occurring in systems having error detection and recovery mechanisms, functional elements are combined to form compound functional units comprising at least two evaluation stages, each evaluation stage including at least one functional element. At least one functional element includes error detection/recovery circuitry. The flow of input values to the first evaluation stage in the compound functional unit is controlled so that the input values are changed at most every second clock cycle.

15 Claims, 9 Drawing Sheets

LOW POWER, HIGH RELIABILITY SPECIFIC COMPOUND FUNCTIONAL UNITS

This application claims priority from the US provisional Application No. 61/052,375 filed May 12, 2008, the entire contents of which are incorporated herein by reference.

BACKGROUND OF THE INVENTION

1. Field of the Invention

The present invention relates to the field of data processing, and particular data processing systems having error detection mechanisms.

2. Description of the Prior Art

Dynamic voltage and frequency scaling can be used to reduce the overall energy consumption of a computer system, particularly for systems with high variation in processing requirements. Dynamic voltage and frequency scaling can either be used to push the operating conditions of a circuit beyond the nominal operating conditions assumed during design time in order to achieve improved clock frequency, or to reduce energy consumption at times when the full capabilities of the hardware are not required. However, if the voltage or frequency is scaled too aggressively, then the likelihood of errors occurring may increase. A critical issue for dynamic voltage and frequency scaling enabled computer systems is determining the safe operating voltage or frequency at which maximum execution efficiency is achieved, whilst still guaranteeing correct operation of all components. It is often helpful to be able to detect errors in operation that may occur.

Figures 1A, 1B:
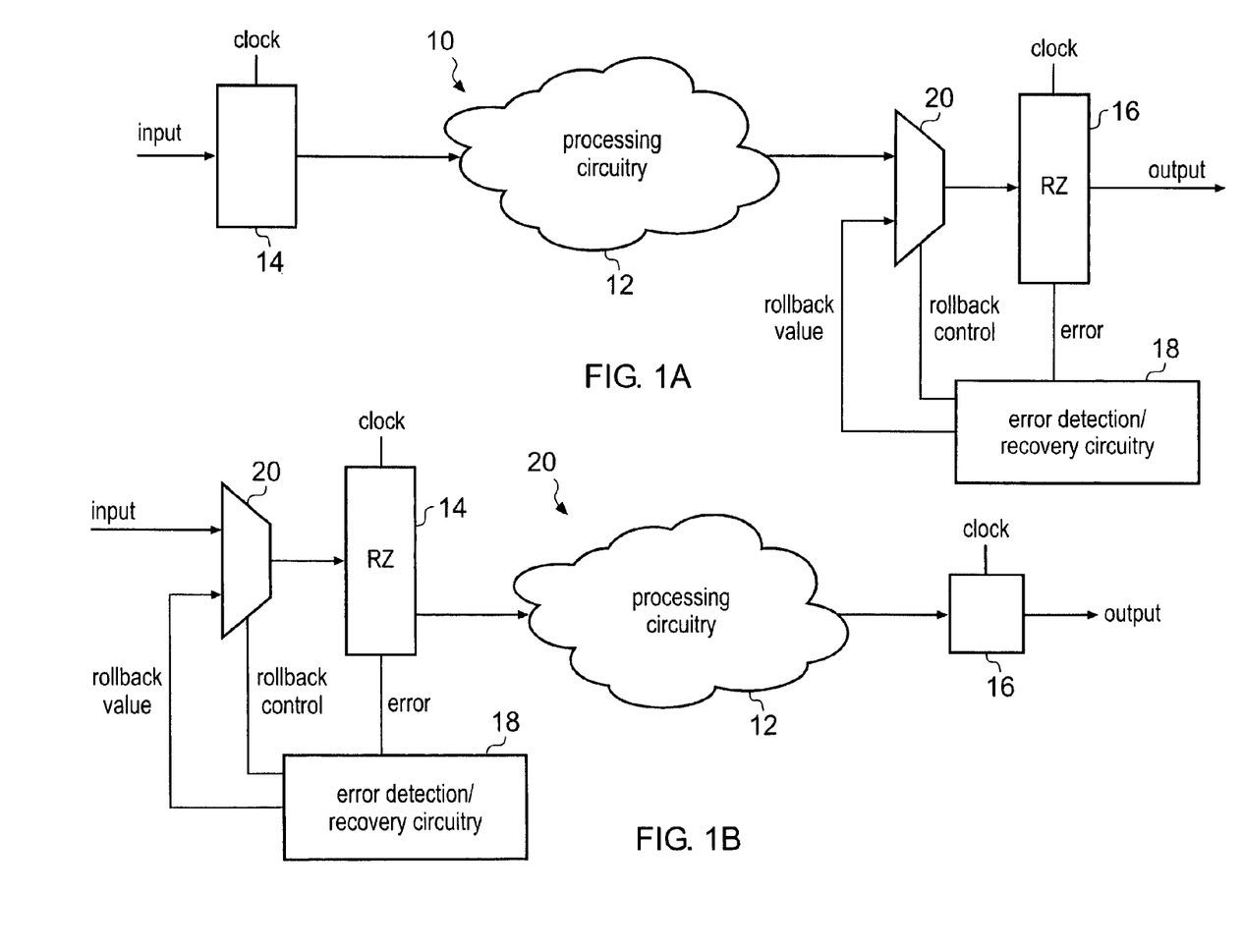
FIG. 1A schematically illustrates a functional element provided with error detection/recovery circuitry.
FIG. 1B illustrates an alternative arrangement in which the input latch of the functional elements has been provided with error detection/recovery circuitry.

One technique for detecting and recovering from errors is the use of "Razor" latches as described in WO-A-2004/084702. FIG. 1A of the accompanying drawings shows a functional element 10 of a data processing system in which the Razor technique has been used. It will be appreciated that the data processing system would typically include a number of such functional elements. The functional element 10 includes processing circuitry 12, an input latch 14, and an output latch 16. The processing circuitry 12 performs processing operations on input values from the input latch 14 and passes output values to the output latch 16. The operations performed by the processing circuitry 12 could include adding, shifting or logic operations, for example. In this example of the Razor technique, the functional element 10 also includes error detection/recovery circuitry 18 coupled to the output latch 16 and a rollback multiplexer 20 positioned between the processing circuitry 12 and the output latch 16. The error detection/recovery circuitry 18 detects changes in the output value of the functional element between a first sampling time and a second sampling time, the sampling window being shorter than one clock cycle. One way in which changes can be detected is by arranging for the output latch 16 to produce an error signal if a change occurs between the two sampling times, and this error signal is then detected and processed by the error detection/recovery circuitry 18. A change in the output value between the first and second sampling times can indicate that the processing circuitry 12 had not yet completed its operations at the time of the first sampling time (an event that will become more likely if the voltage or frequency is scaled too aggressively), and so the output value could be incorrect. If other functional elements in the system have used the output value at the first sampling time for further processing operations, then errors may arise in the operation of these functional elements due to using the incorrect value. Therefore, the error detection/recovery circuitry 18 can perform an error recovery operation so that the processing of at least some functional elements of the system is halted, and a prior state of the system is restored. This can be done by the error detection/recovery circuitry 18 passing a rollback value of the output value to the rollback multiplexer 20 and controlling the rollback multiplexer 20 to select the rollback value and pass this value to the output latch 16. The rollback value could be the value of the output value at the second sampling time, or could be a 'safe' value that is known to work correctly. Accordingly, errors caused by the processing circuitry 12 operating beyond its normal operating conditions can be detected and the system can recover from such errors. The operating voltage and/or the clock frequency can be adjusted depending on the number of errors detected in a given period.

FIG. 1B of the accompanying drawings shows another functional element 20, in which the Razor technique has also been used. In this case, the additional circuitry 18, 20 has been applied to the input latch 14, such that changes in the input value over a given period of time are detected and errors flagged by the error detection/recovery circuitry 18. The operation of the Razor circuitry 18, 20 is as discussed above. A change in the input value between the first and second sampling times could indicate, for example, that a functional element preceding the functional element 20 had not completed its operation at the time that the functional element 20 had received its input value. In the following description, the examples discussed will generally have an output latch that is provided with error detection/recovery circuitry 18 and this latch will be referred to as a "Razor latch". However, the skilled person will appreciate that the input latch could also be a Razor latch.

The use of Razor latches can cause a problem if the time taken for the processing circuitry 12 to produce its output value is particularly short. In the system of FIG. 1A, for example, in one clock cycle the processing circuitry 12 processes an input value from the input latch 14 and the resulting output value is latched in the output latch 16. The output value of the processing circuitry 12 is then sampled at the first sampling time. In a subsequent clock cycle, the processing circuitry 12 is provided with a second input value from the input latch 14 and produces a second output value. If the time taken to produce the second processing output value is shorter than the interval between the first sampling time and the second sampling time at the output latch 16, then the error detection/recovery circuitry 18 can detect a change in the output value of the processing circuitry 12, even if the value at the first sampling time was correct. This will result in a false positive detection of an error. A possible reason for the processing circuitry 12 being so quick to produce its output value could be that the particular path used to calculate the value uses a fewer number of gates than other paths through the processing circuitry 12. For this reason, this type of false detection of an error is known as a short path error. Short path errors can trigger an error recovery operation unnecessarily, which will be costly in terms of time and power required for the processing operations. Also, short path errors could cause further errors at later stages of processing if the value at the second sampling time (i.e. the value produced by the processing circuitry 12 one cycle later than the actual value) is used by subsequent functional elements. It is therefore desirable to reduce the number of short path errors, so as to decrease the number of detected changes in output or input values and increase the likelihood that a detected change represents an actual error in operation.

Figure 2:
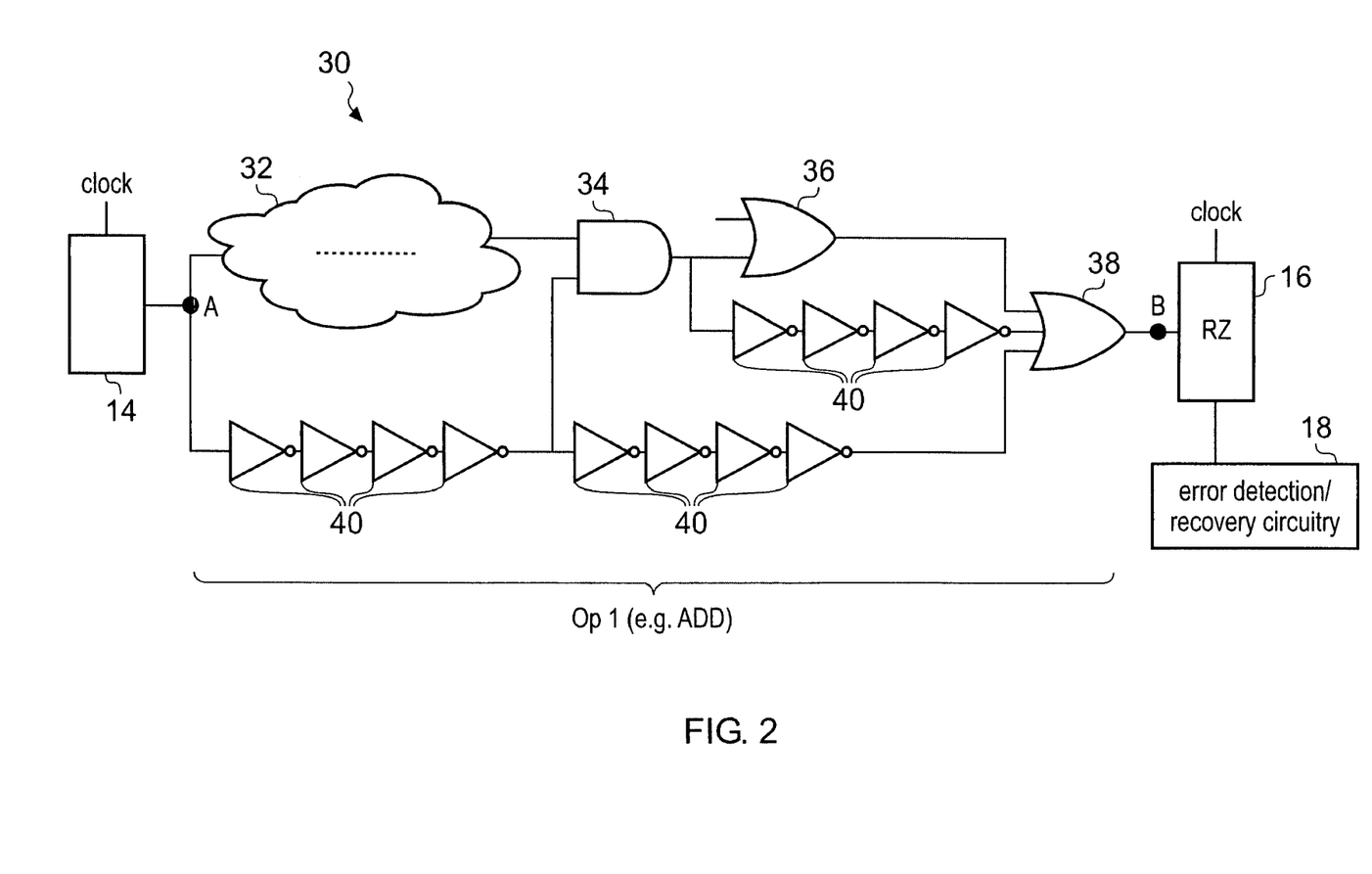
FIG. 2 shows a functional element in which the short path problem has been addressed by providing additional buffers to increase the processing time for some paths in the functional element.

FIG. 2 of the accompanying drawings shows one way of preventing short path errors from occurring. In this example, the operation performed by the functional element 30 is an ADD operation. The functional element 30 includes circuitry 32, 34, 36, 38 for performing the ADD operation. In this example, the Razor latch is the output latch 16, although it could also be the input latch 14. For simplicity, the rollback multiplexer 20 has been omitted in FIG. 2. FIG. 2 illustrates several paths linking point A, where the input value is fed into the functional element from the input latch 14, and point B, where the output value is latched. To address the short path problem, extra buffers 40 are inserted into the shorter paths through the functional element 30 so that the time taken for the shortest path in the design to complete is longer than the interval between the first and second sampling times of the Razor latch. However, adding extra buffers is costly in terms of area and energy consumption, thereby impacting on any gains achieved through dynamic voltage and frequency scaling.

It is an object of the present invention to address the short path problem without unduly increasing the circuit area and/or energy consumption of the system.

SUMMARY OF THE INVENTION

Viewed from one aspect, the present invention provides a data processing apparatus comprising:

a plurality of functional elements responsive to one or more input values and a clock signal to produce at least one output value, at least some of said functional elements being arranged to form at least one compound functional unit, each compound functional unit having at least two evaluation stages and each evaluation stage comprising at least one of said functional elements with output values from functional elements in an evaluation stage being forwarded to a next evaluation stage; wherein at least one functional element within at least one compound functional unit is an error detecting functional element having error detecting circuitry for detecting a change in at least one of an input value and an output value of said error detecting functional element between a first sampling time and a second sampling time and error recovery circuitry for performing an error recovery operation if said change is detected by said error detecting circuitry, the interval between said first sampling time and said second sampling time being shorter than one clock cycle of said clock signal; and said data processing apparatus further comprises input flow controlling circuitry for controlling the flow of input values into said at least one compound functional unit such that input values for the functional elements in the first of said at least two evaluation stages of said at least one compound functional unit are changed at most every second clock cycle.

The present technique addresses the short path problem by combining multiple functional elements to form compound functional units. Each compound functional unit has at least two evaluation stages, each evaluation stage having at least one functional element. At least one functional element within at least one of the compound functional units includes the Razor circuitry for detecting and recovering from errors. Processing operations are executed by the functional elements in each evaluation stage as intermediate data values pass from stage to stage in successive clock cycles. Short path errors are prevented by controlling the flow of input values into the compound functional units such that the input values for the first of the evaluation stages of the compound functional units are changed at most every second clock cycle. This means that the second evaluation stage will begin processing the output value from the first evaluation stage before the first evaluation stage has been provided with its next input value. Since the interval between the first and second sampling times is less than one clock cycle, the second sampling time will always occur before the second set of input values is provided to the first stage of the compound functional units, thus avoiding the short path problem. Using compound functional units in this way means that the processing throughput of the apparatus is higher than if each individual functional element was clocked every other cycle.

The number of evaluation stages in a compound functional unit can be any number greater than one. However, a particularly preferred number of the evaluation stages is two. Two evaluation stages are enough to address the short path problem. Also, the smaller the number of stages in the compound functional unit is, the more likely it is that the compound functional unit will perform a sequence of processing operations that appears relatively often in a particular process to be performed by the data processing apparatus. If the compound functional unit can be reused for several instances of the same sequence of processing operations in a desired process, then the hardware can be realised more efficiently.

One example of an error recovery operation performed by the Razor circuitry is when the error recovery circuitry halts operation of said compound functional unit and restarts processing using the value of said input value or said output value of said error detecting functional element at said second sampling time.

In this case it is assumed that at the second sampling time the functional element had finished processing the data and that the value at the second sampling time is therefore the correct output value.

Alternatively, when performing the error recovery operation performed the error recovery circuitry could halt operation of said compound functional unit and restart processing at the first evaluation stage of said compound functional unit.

At least sometimes, when the error detecting circuitry detects an error, the error recovery circuitry could allow said compound functional unit to continue processing using the value of said input value or said output value of said error detecting functional element at said first sampling time.

In this case, the error recovery circuitry effectively ignores the detected change, speculating it to be a false positive. For example, there may be some situations in which the detected change is not significant, and so the cost of halting processing operations may be greater than the cost of using a potentially incorrect value. Detected changes can be ignored if it is known that real timing errors cannot occur (for example, if the clock frequency or voltage settings are such that timing errors are not possible), or if it is determined that using the incorrect data is acceptable.

In a further feature, a compound functional unit can have at least one evaluation stage comprising at least two functional elements, the output values of said at least two functional elements being used as input values by a functional element in a following evaluation stage.

For example, a compound functional unit could have an evaluation stage in which a functional element adds together two or more values, each value having been produced by a respective functional element in a preceding evaluation stage.

Although the present technique is applicable to data processing apparatuses in general, it is particularly advantageous when the data processing apparatus is a loop accelerator.

A loop accelerator can be used in modulo-scheduling techniques to achieve high parallelism by overlapping execution of successive iterations of a loop by different functional units. By combining at least some of these functional units into compound functional units as in the present invention and controlling the inputs to the compound functional units as described above, the number of short path errors can be reduced.

In a further feature of the present technique, at least one compound functional unit can have two evaluation stages that are separated by a transparent latch, the second of said two evaluation stages including said error detecting functional element.

It is a possible that a functional element in a particular evaluation stage may be late in producing its output value. If each functional element is treated individually, then this would always cause an error to be detected by Razor circuitry associated with that functional element. However, the present technique of combining functional elements into compound functional units means that it is possible for a later evaluation stage to catch up on time lost at an earlier evaluation stage. In this case, error detection circuitry associated with the second of the evaluation stages would not detect a change. To enable the second evaluation stage to recover lost time, the present technique provides a transparent latch separating the two evaluation stages. The transparent latch allows a functional element in the second stage to read values from the transparent latch as soon as they have been provided to the transparent latch by the functional element in the preceding stage. If the compound functional units can recover lost time in this way, then fewer errors will be detected by the Razor circuitry, thus reducing the number of consequent recovery operations and hence the time and power required for performing the processing operations.

Viewed from a further aspect, the present invention provides a method for compiling a hardware design for a data processing apparatus comprising a plurality of functional elements responsive to one or more input values and a clock signal to produce at least one output value, the method comprising the steps of:

inputting design data defining a data flow graph for processing operations to be performed by said plurality of functional elements of said data processing apparatus;

analyzing said data flow graph to identify at least one group of at least two processing operations that can be performed by a corresponding compound functional unit formed of at least two of said plurality of functional elements; and generating, for each said group identified in said analyzing step, machine-readable data representing a portion of said hardware design for the compound functional unit corresponding to said group, said compound functional unit having at least two evaluation stages and each evaluation stage comprising at least one of said functional elements with output values from functional elements in an evaluation stage being forwarded to a next evaluation stage; wherein at least one functional element within at least one compound functional unit is an error detecting functional element having error detecting circuitry for detecting a change in at least one of an input value and an output value of said error detecting functional element between a first sampling time and a second sampling time and error recovery circuitry for performing an error recovery operation if said change is detected by said error detecting circuitry, the interval between said first sampling time and said second sampling time being shorter than one clock cycle of said clock signal; and said compound functional unit is configured to perform said group of at least two processing operations in response to input values that change at most every second clock cycle.

The present technique realises that the compound functional units of a data processing apparatus can be most efficiently utilised if they are tailored to the specific application to be executed by the data processing apparatus. The present technique therefore provides a method for compiling a hardware design for the data processing apparatus in which preferred combinations of functional elements required can be identified. Design data defining a data flow graph for processing operations to be performed is inputted, and the data flow graph is analysed to identify at least one group of at least two processing operations that can be performed by a corresponding compound functional unit. Then, machine-readable data representing the part of the hardware design for each compound unit is generated. In this way, a design for a data processing apparatus that makes efficient use of its hardware resources is produced.

The machine-readable data representing the portion of the hardware design for the compound functional unit may also be recorded to a recording medium. The recording medium could be distributed to hardware manufacturers, for example.

Although a compound functional unit can have two or more evaluation stages, a preferred number of stages is two. Smaller compound functional units are more likely to be used relatively frequently when executing the operations specified in the data flow graph.

During the step of identifying groups of at least two processing operations that can be performed by a compound functional unit, the group selection algorithm according to the present technique tries to minimise the number of processing operations that are not identified as part of a group. This means that fewer functional elements will be susceptible to short path errors.

Also, when identifying groups of processing operations, the present technique preferentially selects larger groups of processing operations over smaller groups of processing operations. This will help to reduce the total number of compound functional units required. Even though having fewer, larger compound functional units may not reduce the amount of processing circuitry required, there may be some additional hardware that is provided on a per functional unit basis (e.g. register files), and so having fewer compound functional units would result in a corresponding reduction in this additional hardware.

It is possible that the same group of processing operations may be identified in more than one instance in the data flow graph. In this case, the generating step generates machine-readable data for a single compound functional unit that can perform each instance of the same group of processing operations. By reusing a compound functional unit in this way, less hardware is needed, thus saving on circuit area and power consumption.

Viewed from a further aspect, the present invention provides a computer-readable storage medium storing a computer program for controlling a computer to perform the method for compiling a hardware design as discussed above.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 3:
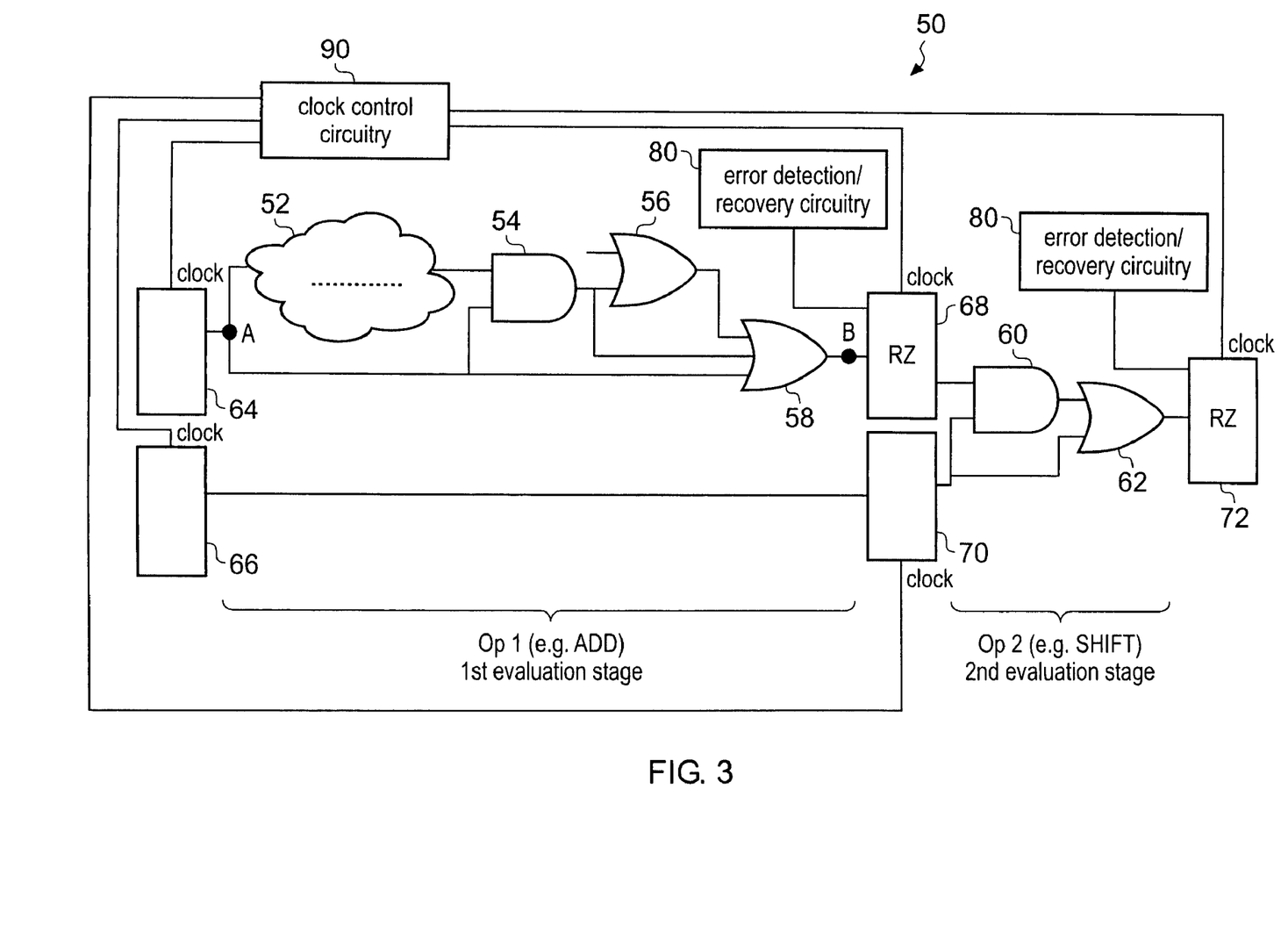
FIG. 3 shows a compound functional element according to the present technique.

FIG. 3 shows a compound functional unit 50 according to the present technique. In this example the compound functional unit 50 has two evaluation stages, although it will be appreciated that there could be more evaluation stages. The first evaluation stage includes circuitry 52 and gates 54, 56, 58 for performing an ADD operation, for example. The circuitry 52, 54, 56 and 58 collectively make up a functional element. The first evaluation stage has input latches 64, 66 and output latches 68, 70. The second evaluation stage has a functional element for performing a SHIFT operation. The functional element in the second evaluation stage includes gates 60, 62. The output latches 68, 70 for the first evaluation stage are reused as input latches for the second evaluation stage. The second evaluation stage has an output latch 72. In the example shown in FIG. 3, latches 68 and 72 have been provided with error detection/recovery circuitry 80 according to the Razor technique. Again, for conciseness the rollback multiplexers have not been illustrated.

The compound functional unit 50 also has clock control circuitry 90 for controlling the timings of operations in the compound functional unit 50. The first and second evaluation stages perform the ADD and SHIFT operations in back-to-back clock cycles. The clock control circuitry 90 supplies a clock signal to the latches 64, 66, 68, 70, 72 so as to control the flow of input and output values through the evaluation stages of the compound functional unit. To prevent short path errors, the clock control circuitry 90 controls the flow of input values into the first evaluation stage of the compound functional unit 50 so that the input values are changed at most every other clock cycle. By preventing input values at the input latches 64, 66 being changed in successive clock cycles, the values that fan into the Razor latches 68, 72 are guaranteed not to change during the sampling window of the error detection/recovery circuitry 80 (the sampling window being the time period between the first and second sampling times and being shorter than one clock cycle). This means that there is no need to insert extra buffers to lengthen the processing paths, and so the short path problem can therefore be addressed without requiring additional hardware that will increase the area and energy cost of running the system.

Figure 4:
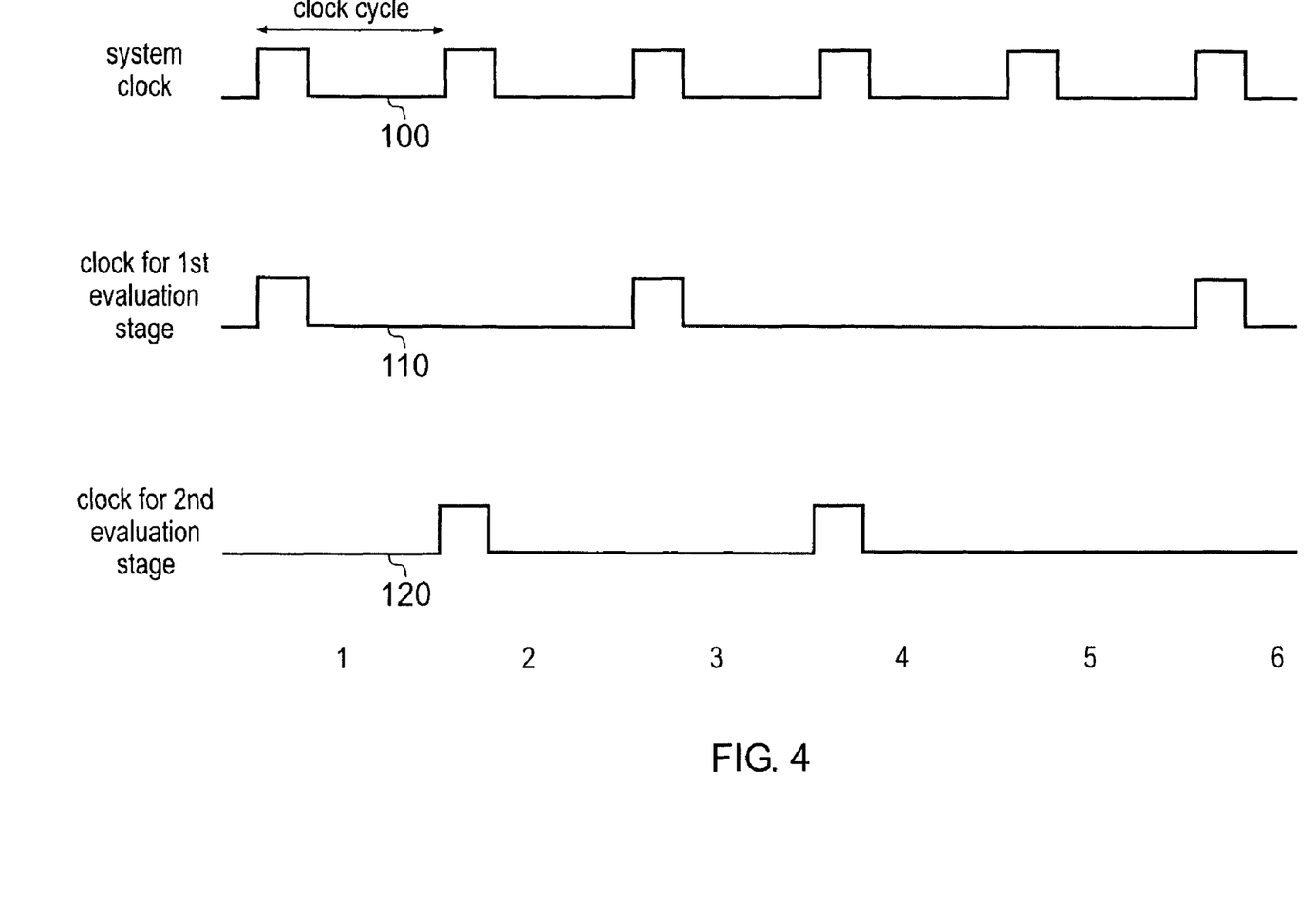
FIG. 4 shows an example of a clock signal for controlling the timing of operations of the compound functional unit.

FIG. 4 illustrates an example of how the clock control circuitry 90 can control the compound functional unit 50 so as to avoid short path errors. The system operates under control of a system clock signal 100 having a given clock cycle. The input latches 64, 66 for the first evaluation stage and the input latches 68, 70 for the second evaluation stage may be responsive to sub-sampled versions of the system clock signal 100. Clock signal 110 represents an example of a sub-sampled signal for the input latches to the first evaluation stage, and signal 120 shows an example of a sub-sampled signal for the input latches to the second evaluation stage of the compound functional unit 50. Clock signals 110 and 120 are formed such that the input latches for the first and second evaluation stages are latched alternately, and so that the minimum interval between two successive pulses for the input latches to the first evaluation stage is two clock cycles.

For compound functional units having more than two evaluation stages, the pulses in the sub-sampled clock signal for the further stages would occur in clock cycles following pulses in the sub-sampled signal of the preceding stage, similar to the relationship between the sub-sampled signals for the first and second stages as illustrated in FIG. 4. In this way, the functional elements in the evaluation stages are controlled to perform processing operations in successive cycles.

Although the maximum rate at which the input values for the compound functional unit 50 may be changed is every second clock cycle, it is possible that the input values may change less frequently than this. For example, in FIG. 4 the sub-sampled clock signal 110 for the first evaluation stage has an interval of three clock cycles between its second and third pulses. One reason for this may be if the compound functional unit 50 is waiting for another functional unit to produce values required for processing.

Figure 5:
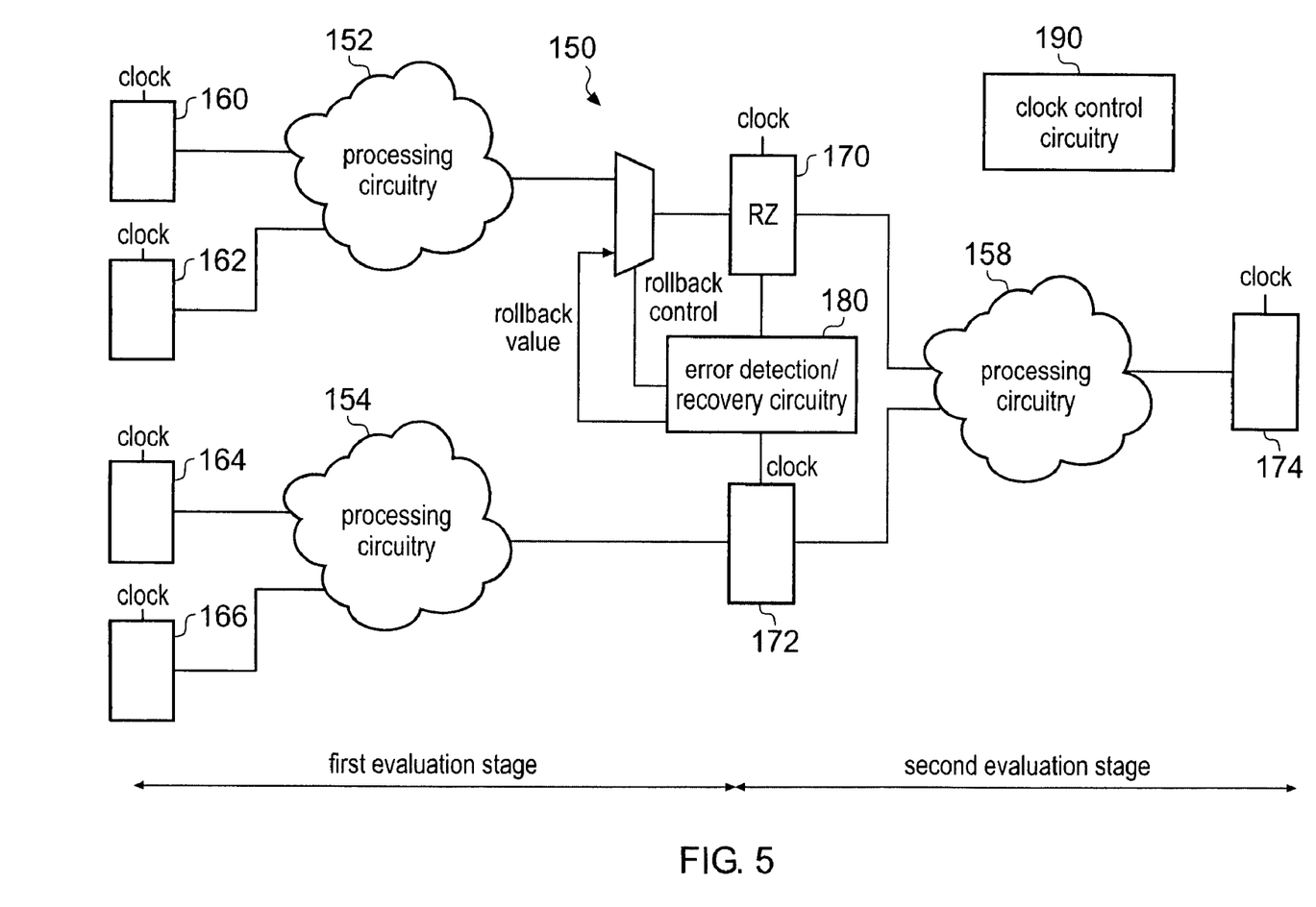
FIG. 5 illustrates a compound functional unit in which an evaluation stage has multiple functional elements.

FIG. 5 shows another example of a compound functional unit 150. In this example the first evaluation stage includes two functional elements each having respective processing circuitry 152, 154. The output values of the functional elements 152, 154 are used as input values by the processing circuitry 158 of a functional element in the second evaluation stage. For example, the circuitry 158 could perform an ADD operation for adding together the outputs of the processing circuitry 152 and the processing circuitry 154. The operation of the compound functional unit 150 is similar to that of the example shown in FIG. 3.

Note that it is not necessary that every functional element in the compound functional unit 150 is associated with a Razor latch. In this example, only the output latch 170 for one of the functional elements 152 of the first evaluation stage is provided with error detection/recovery circuitry 180. It is also possible that a compound functional unit has no functional elements with Razor circuitry. For example, if two sequences of operations are to be performed in parallel, and one sequence has been combined into a compound functional unit to prevent short path errors occurring then it may be desirable to also produce a compound functional unit for the second sequence even if the functional units for the second sequence of operations do not have Razor circuitry, so as to manage the timings of the parallel sequences more easily (especially if the results of the two sequences of operations are to be used by a later operation).

Figure 6:
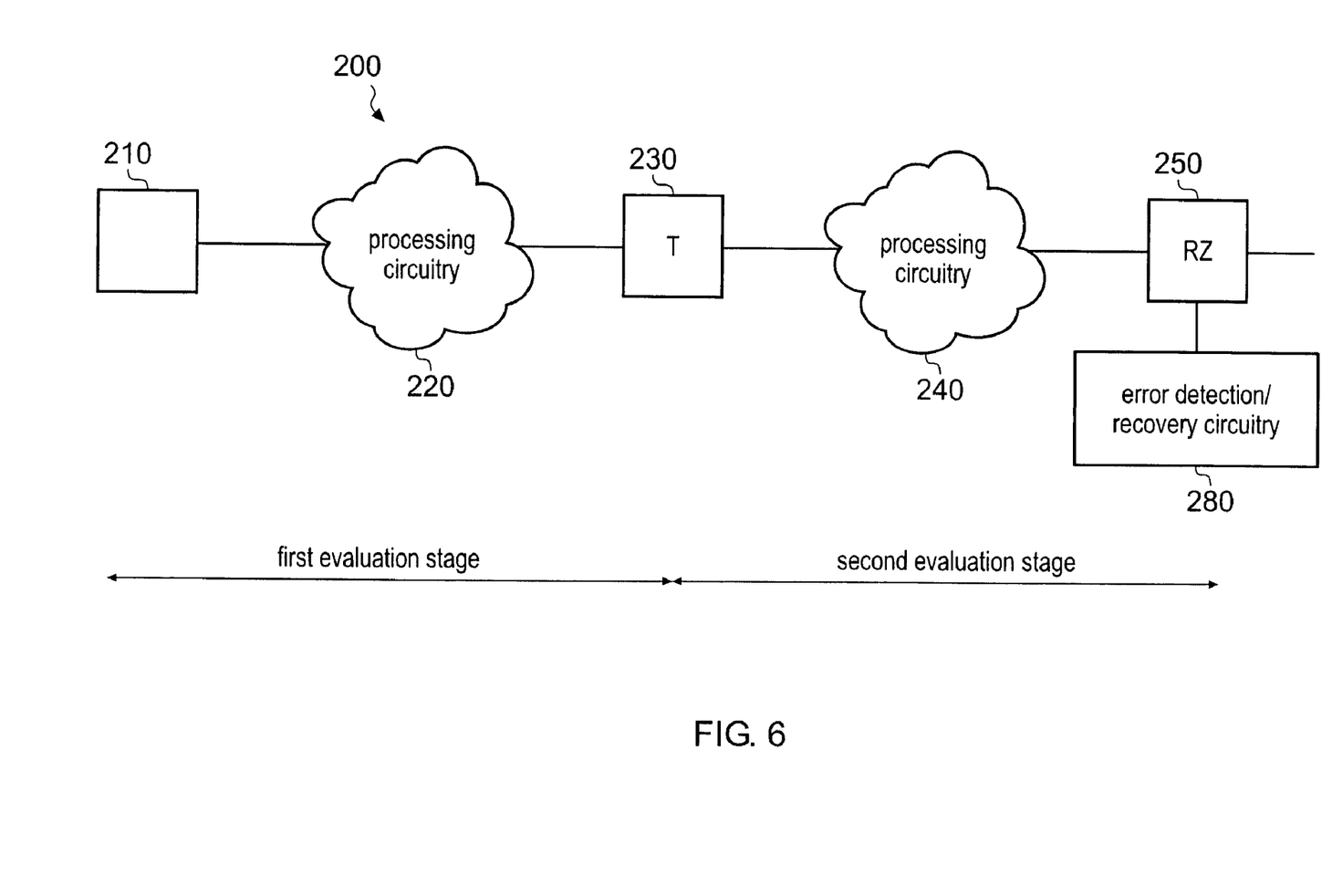
FIG. 6 shows a compound functional unit in which two evaluation stages are separated by a transparent latch.

FIG. 6 shows a compound functional unit 200 that has been adapted to enable a later evaluation stage to recover from delays in processing that have occurred at an earlier evaluation stage. In the compound functional unit 200, input values from an input latch 210 are provided to processing circuitry 220 for processing the input values and outputting a result value to a transparent latch 230. The value from the transparent latch 230 is used by processing circuitry 240 to produce an output value which is latched in a Razor latch 250. The transparent latch 230 allows the processing circuitry 240 to use the value provided to the transparent latch 230 by the processing circuitry 220 as soon as it has been provided. This means that even if the processing circuitry 220 is late in producing its output value, the processing circuitry 240 can begin its processing as soon as the processing circuitry 220 has finished its processing. If the time taken for the processing circuitry 240 in the second evaluation stage to perform its operation is short enough, then its output may be latched at the Razor latch 250 before the first sampling time of the error detection/recovery circuitry 280. In this way, the second evaluation stage can make up for time lost in the first evaluation stage, thus preventing the error which could have arisen if the latch 230 was not transparent. By using compound functional units having two evaluation stages separated by a transparent latch, it is possible for a functional element in one evaluation stage to effectively borrow time from a functional element in another evaluation stage. This helps to reduce the total number of errors detected by the error detection/recovery circuitry 280, and means that it is less important that each and every functional element in the system operates to schedule.

Figure 7:
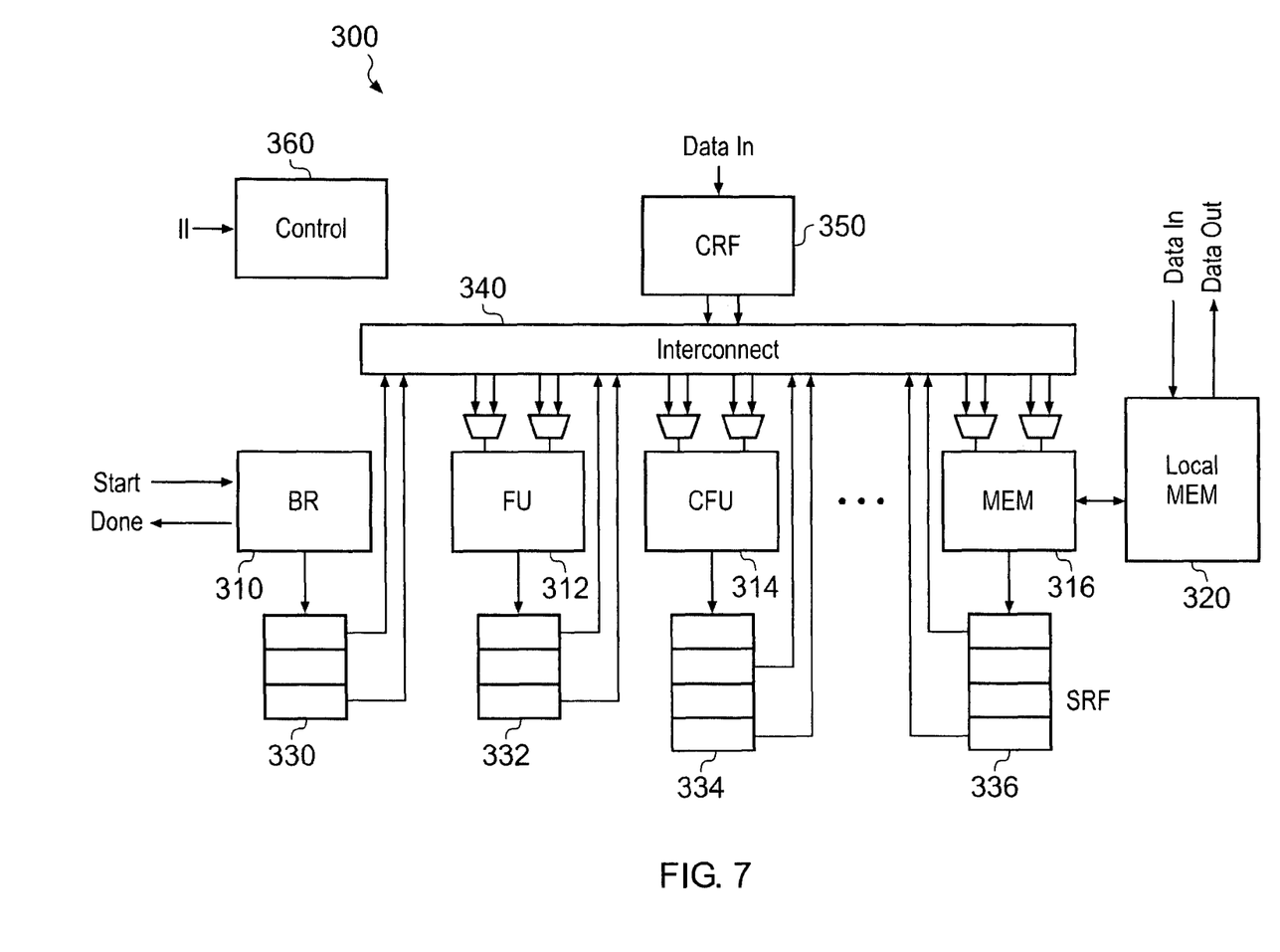
FIG. 7 illustrates a loop accelerator that uses a compound functional unit according to the present technique.

Although the present technique is of general application in data processing apparatuses, it is particularly useful in a loop accelerator, such as the loop accelerator 300 illustrated in FIG. 7. The loop accelerator 300 has a number of functional units 310, 312, 314, 316 for executing successive iterations of a loop in parallel. For example, the loop accelerator 300 can include a pipeline 310 for executing branch operations and a pipeline 316 for executing operations for loading and storing values to a memory 320. The loop accelerator can also include several functional units 312, 314 for performing other operations. At least one of these functional units can be a compound functional unit 314 according to the present technique. Each functional unit 310, 312, 314, 316 has a corresponding shift register file 330, 332, 334, 336 for storing the values produced by the corresponding functional unit in the order in which they were produced. Values can be passed between different functional units and shift register files via an interconnect 340. In addition, a central register file 350 holds values which cannot be stored in the shift register files. A control unit 360 is provided to schedule operations for different functional units in accordance with a performance requirement specified as an initiation interval (II). It will be appreciated that the loop accelerator 300 can include more functional units than those illustrated in FIG. 7. By combining more of the functional units into compound functional units, the likelihood of short path errors occurring in the loop accelerator 300 can be reduced.

Figure 8:
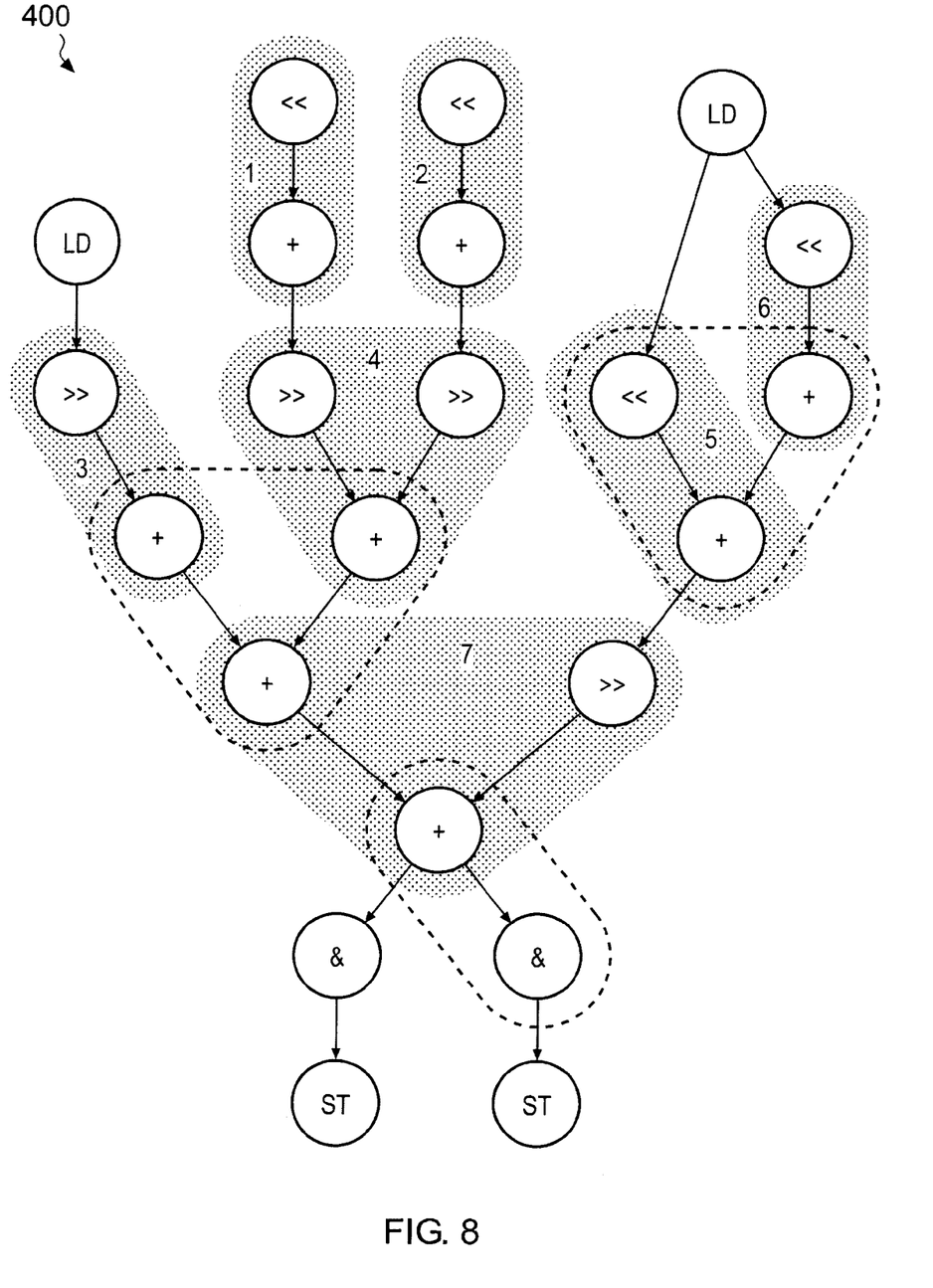
FIG. 8 shows a data flow graph used for identifying groups of operations that could be performed by a compound functional unit.

It will be appreciated that the functional elements in a data processing apparatus could be combined into compound functional units in a variety of different ways. It is therefore important, when designing the processing apparatus, to identify arrangements of compound functional units that will make most efficient use of the hardware resources available. Often, data processing apparatuses will be designed for a particular purpose and to execute a specified set of processing operations. The processing operations to be performed by the functional elements of a data processing apparatus can be represented by a data flow graph. FIG. 8 illustrates an example of a data flow graph 400. Each node in the data flow graph 400 represents an input, an output or an operation to be performed, and each edge represents the data flow between nodes of the data flow graph 400.

Figure 9:
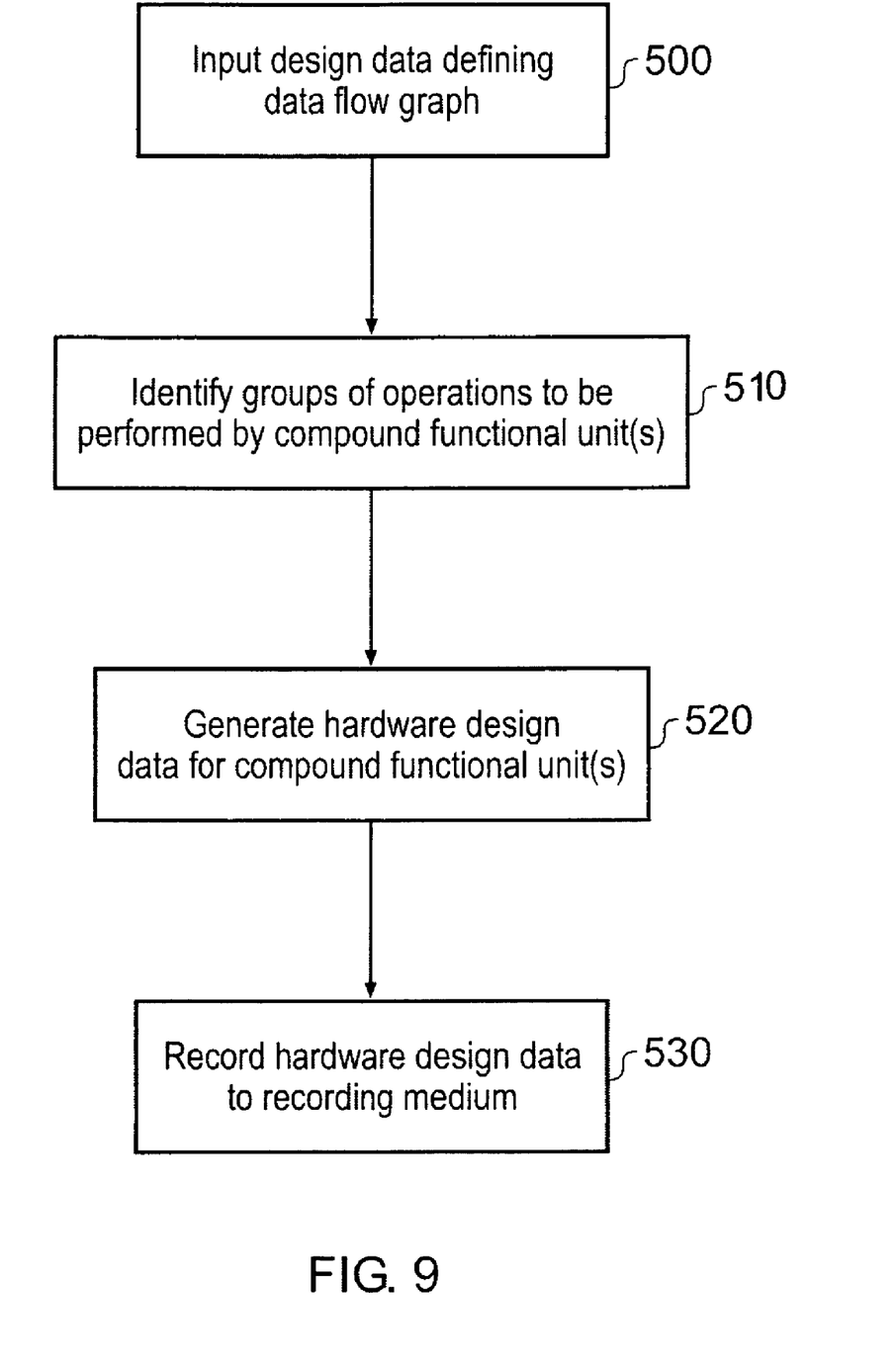
FIG. 9 shows a flow graph demonstrating a method for compiling a hardware design of a data processing apparatus including compound functional units.

FIG. 9 shows a flow chart illustrating a method for compiling a hardware design for a data processing apparatus. In step 500, design data is input. The design data defines a data flow graph that represents processing operations to be performed by the data processing apparatus. Next, the data flow graph is analysed in step 510 to identify one or more groups of at least two processing operations that can be performed by a corresponding compound functional unit. Then, at step 520, hardware design data is generated for the compound functional units associated with the groups identified in step 510. The hardware design data is machine-readable data specifying the design of the compound functional units. The hardware design data specifies how the apparatus should be configured. In step 530, the hardware design data is recorded to a recording medium, which can be distributed to manufacturers of the data processing apparatus. Step 530 is not always necessary, since the data could be used without first recording it to a recording medium.

Step 510 of FIG. 9 will now be explained in more detail, with reference to the data flow graph 400 shown in FIG. 8. When identifying groups of processing operations that may be performed by a compound functional unit, the aim is to try and include as many operations into compound functional units as possible while minimizing the number of operations which are not part of a functional unit, giving priority to fewer, larger compound functional units over many, smaller compound functional units. For example, in the sequence of operations shown in FIG. 8, the operations in shaded areas 1, 2, 3, 5 and 6 are combined to form three-operand, two-operation compound functional units (such as the compound functional unit 50 shown in FIG. 3); and the operations in shaded areas 4 and 7 are combined to form four-operand, three-operation compound functional units (such as the compound functional unit 150 shown in FIG. 5).

As explained previously, the selection algorithm used is a greedy algorithm that selects the largest possible combinations searching upwards from the bottom of the loop while minimizing the number of unique individual operations. In this example, the group of operations indicated by the shaded area 5 in FIG. 8 could have been expanded to include the addition operation in group 6. However, this would leave the left-shift operation in group 6 alone and a separate left-shift functional unit would be required to implement this operation. Therefore, the selection algorithm has included the addition operation in group 6, not group 5. Also, the ADD and AND operation circled in dotted lines at the bottom of FIG. 8 could have been selected as a group of operations to be performed by a compound functional unit. However, since priority is given to the larger group 7, and since an AND functional unit would still be required to implement the remaining AND operation at the bottom of FIG. 8, creating a compound functional unit for the ADD and AND would not necessarily have any benefit.

Also, FIG. 8 shows that the same sequence of operations can occur in multiple instances in a data flow graph. For example, the groups of operations indicating by the shaded areas 1, 2, 3, 5, and 6 all comprise a SHIFT operation followed by an ADD operation. This means that a single compound functional unit can be used to execute each instance of the sequence of operations, thus saving on circuit hardware. The operations shown in groups 4 and 7 in FIG. 8 are also similar, and differ only in that one of the shift operations in group 4 is replaced by an add operation in group 7. In this case, a compound functional unit could be formed in which at least part of the compound functional unit is reused for each group of operations, depending on the scheduling requirements of these groups.

By identifying groups of operations in this way, compound functional units can be designed to more efficiently utilise the circuit resources of the system in a way that is specific to the particular operations that the system is designed to perform.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
a plurality of functional elements responsive to one or more input values and a clock signal to produce at least one output value, at least some of said functional elements being arranged to form at least one compound functional unit, each compound functional unit having at least two evaluation stages and each evaluation stage comprising at least one of said functional elements with output values from functional elements in an evaluation stage being forwarded to a next evaluation stage; wherein
at least one functional element within at least one compound functional unit is an error detecting functional element having error detecting circuitry for detecting a change in at least one of an input value and an output value of said error detecting functional element between a first sampling time and a second sampling time and error recovery circuitry for performing an error recovery operation if said change is detected by said error detecting circuitry, the interval between said first sampling time and said second sampling time being shorter than one clock cycle of said clock signal; and
said data processing apparatus further comprises input flow controlling circuitry for controlling the flow of input values into said at least one compound functional unit such that input values for the functional elements in the first of said at least two evaluation stages of said at least one compound functional unit are changed at most every second clock cycle.

2. A data processing apparatus according to claim 1, wherein the number of evaluation stages in said at least one compound function unit is two.

3. A data processing apparatus according to claim 1, wherein said error recovery operation performed by said error recovery circuitry halts operation of said compound functional unit and restarts processing using the value of said input value or said output value of said error detecting functional element at said second sampling time.

4. A data processing apparatus according to claim 1, wherein said error recovery operation performed by said error recovery circuitry halts operation of said compound functional unit and restarts processing at the first evaluation stage of said compound functional unit.

5. A data processing apparatus according to claim 1, wherein at least sometimes said error recovery operation performed by said error recovery circuitry allows said compound functional unit to continue processing using the value of said input value or said output value of said error detecting functional element at said first sampling time.

6. A data processing apparatus according to claim 1, wherein at least one compound functional unit has at least one evaluation stage comprising at least two functional elements, the output values of said at least two functional elements being used as input values by a functional element in a following evaluation stage.

7. A data processing apparatus according to claim 1, wherein said data processing apparatus is a loop accelerator.

8. A data processing apparatus according to claim 1, wherein at least one compound functional unit has two evaluation stages that are separated by a transparent latch, the second of said two evaluation stages including said error detecting functional element.

9. A method for compiling a hardware design for a data processing apparatus comprising a plurality of functional elements responsive to one or more input values and a clock signal to produce at least one output value, the method comprising the steps of:
inputting design data defining a data flow graph for processing operations to be performed by said plurality of functional elements of said data processing apparatus;
analyzing said data flow graph to identify at least one group of at least two processing operations that can be performed by a corresponding compound functional unit formed of at least two of said plurality of functional elements; and
generating, for each said group identified in said analyzing step, machine-readable data representing a portion of said hardware design for the compound functional unit corresponding to said group, said compound functional unit having at least two evaluation stages and each evaluation stage comprising at least one of said functional elements with output values from functional elements in an evaluation stage being forwarded to a next evaluation stage; wherein
at least one functional element within at least one compound functional unit is an error detecting functional element having error detecting circuitry for detecting a change in at least one of an input value and an output value of said error detecting functional element between a first sampling time and a second sampling time and error recovery circuitry for performing an error recovery operation if said change is detected by said error detecting circuitry, the interval between said first sampling time and said second sampling time being shorter than one clock cycle of said clock signal; and
said compound functional unit is configured to perform said group of at least two processing operations in response to input values that change at most every second clock cycle.

10. A method for compiling a hardware design according to claim 9, further comprising the step of recording said machine-readable data to a recording medium.

11. A method for compiling a hardware design according to claim 9, wherein the number of evaluation stages in said at least one compound functional unit is two.

12. A method for compiling a hardware design according to claim 9, wherein said analyzing step identifies said at least one group of at least two processing operations so as to minimize the number of said plurality of processing operations that are not identified as part of a group.

13. A method of compiling a hardware design according to claim 9, wherein said analyzing step identifies said at least one group of at least two processing operations so as to preferentially select larger groups of processing operations over smaller groups of processing operations.

14. A method of compiling a hardware design according to claim 9, wherein if said analyzing step identifies more than one instance of the same group of processing operations, then said generating step generates machine-readable data for one compound functional unit that can perform each instance of said group of processing operations.

15. A non-transitory computer-readable storage medium storing a computer program for controlling a computer to perform the method of compiling a hardware design according to claim 9.

* * * * *